United States Patent [19]
Walker

[11] 3,930,194
[45] Dec. 30, 1975

[54] INVERTER CONTROL CIRCUIT
[75] Inventor: Loren H. Walker, Schenectady, N.Y.
[73] Assignee: General Electric Company, Schenectady, N.Y.
[22] Filed: Oct. 21, 1974
[21] Appl. No.: 516,771

[52] U.S. Cl. .................. 321/11; 321/14; 321/18; 321/19
[51] Int. Cl.² .......................................... H02M 1/18
[58] Field of Search .................. 321/11, 14, 18, 19

[56] References Cited
UNITED STATES PATENTS

| | | |
|---|---|---|
| 3,611,330 | 10/1971 | Cacossa ........................... 321/18 X |
| 3,805,142 | 4/1974 | Rando ............................. 321/19 X |
| 3,840,797 | 10/1974 | Aggen et al ..................... 321/19 X |

Primary Examiner—William M. Shoop
Attorney, Agent, or Firm—Stephen B. Salai; Joseph T. Cohen; Jerome C. Squillaro

[57] ABSTRACT

A control circuit for a solid state inverter includes a sensor responsive to instantaneous transformer flux which provides an output signal to control the switching times of a pair of solid state switching devices in the inverter to maintain a constant level of peak flux for each half cycle of operation of the inverter. An additional current sensor provides for peak current limiting to prevent overcurrent in the case of short circuit output conditions.

9 Claims, 12 Drawing Figures

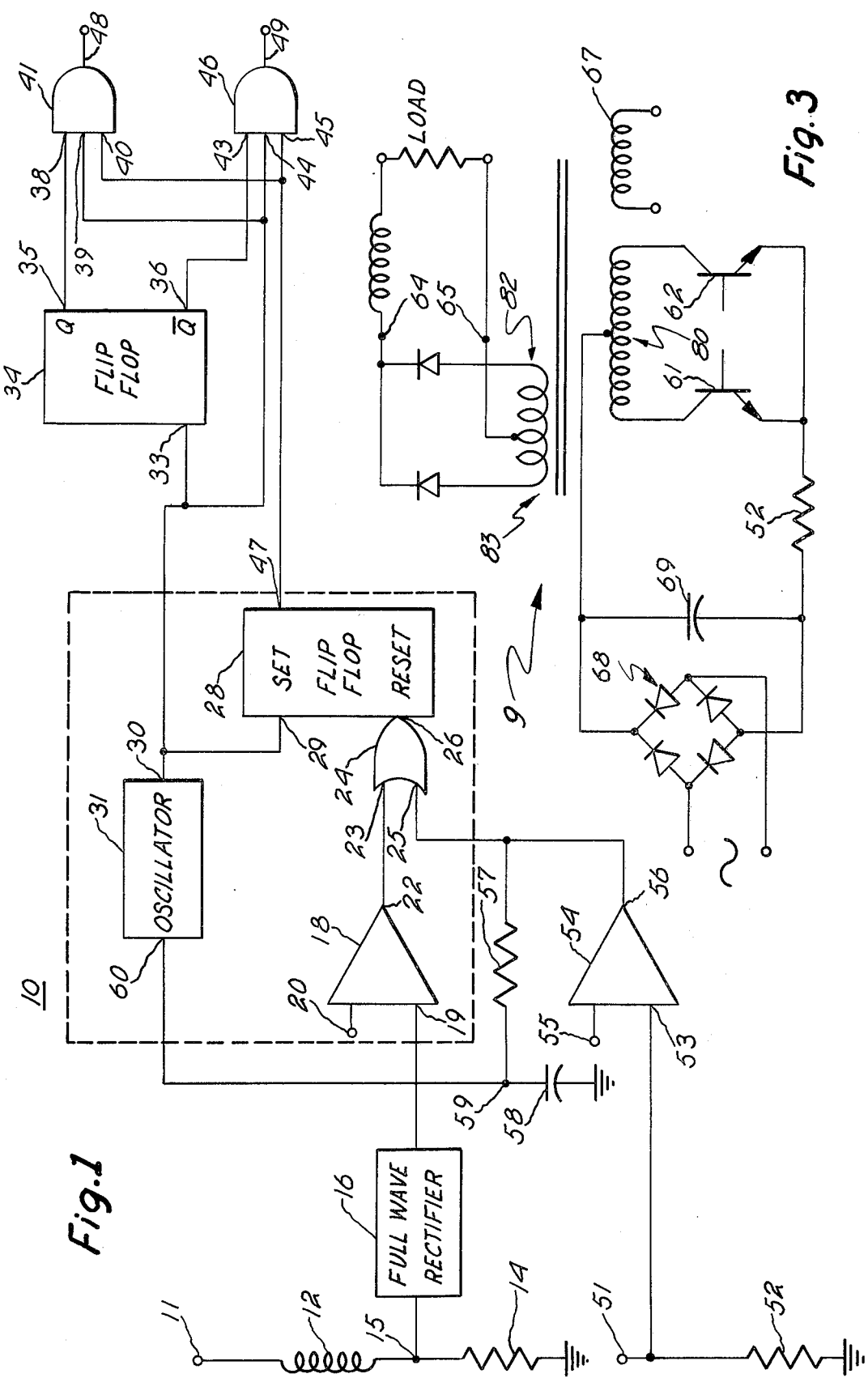

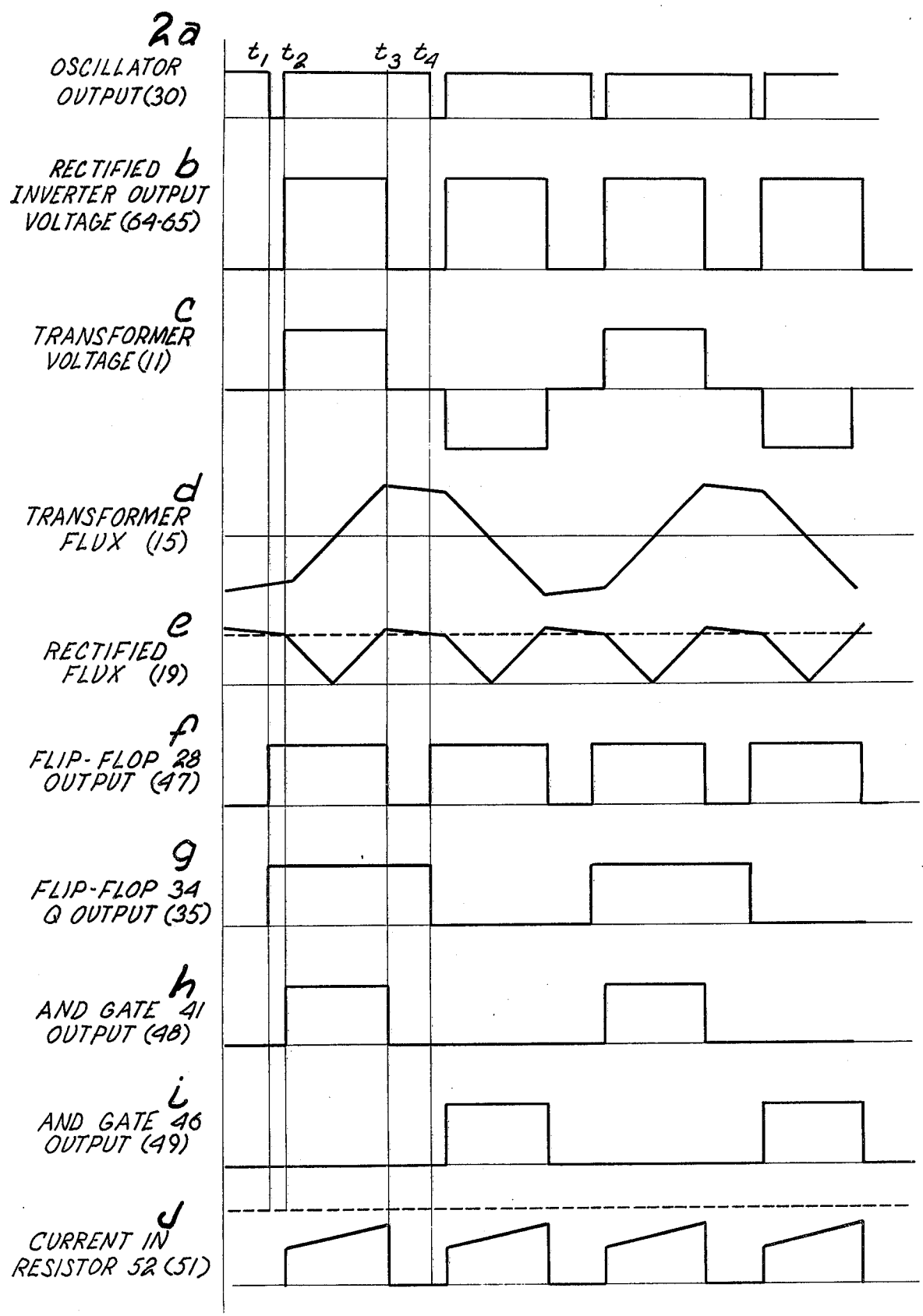

INVERTER CONTROL CIRCUIT

This invention relates, in general, to solid state inverter power supplies and, more particularly, to a control system for such supplies.

Solid state inverter power supplies have long been known in the art. Among the earlier embodiments were d.c. to d.c. supplies of the type utilized to power, for example, radio equipment in automobiles. Early embodiments of this type utilized electromechanical vibrators to convert d.c. battery voltage to square wave a.c. voltage which could then be passed through a transformer to achieve desired voltage change ratios. More recently, the advent of economical solid state switching devices has made possible inverters which do not require electromagnetic vibrators for d.c. to a.c. conversion. Additionally, the capability of transistors to be precisely controlled as to turn-on and turn-off has enabled significant advances in the control of inverters of the type with which this invention is concerned. For example, output voltage and/or output current may easily be regulated by controlling the switching times of solid state inverter switches rather than, for example, controlling series impedances in the power circuits themselves. Significant advantages in terms of efficiency may be realized in this manner since it is not necessary to dissipate unused power in series regulating means.

While power supplies of the type hereinabove described, which are sometimes referred to as switching power supplies, offer significant advantages over prior art power supplies, they do so at the expense of a certain amount of complexity. The class of switching power supplies discussed herein are inverter supplies. It is a problem of power supplies of this type that variations in device or transformer parameters as well as perturbations in operating conditions may cause asymmetrical conduction of the switching devices. Without means for correcting such asymmetries there is a tendency for inverter voltage to accumulate asymmetry error and cause operation to rise on the transformer hysteresis curve to the point of saturation, causing excessive switching losses in the transistors. This effect is more pronounced in state-of-the-art inverters where the losses both in the transformer and in the devices are minimized, which losses tended in earlier embodiments to compensate for the effect described. It is therefore necessary to include in inverters where extremely high efficiencies are practiced, means for preventing transformer saturation due to this "ratchet effect."

A number of techniques have been employed to solve the above-mentioned problem. The insertion of an inductor into the primary, main current, path of the inverter is presently the most popular method to remedy the detrimental effects of asymmetrical switching. The inductor inhibits rapid current changes which, in turn, prevents damaging saturation current spikes. This method has the disadvantage of requiring the addition of high power components which may be expensive. Another approach has been the detection of the asymmetry by error detectors which are, in turn, used to vary the "on" time of pulse-width modulators restore symmetry to the switching devices utilized. A disadvantage of this method is that it requires a separate control function for symmetry correction in addition to that which controls voltage or current.

In some applications it may be necessary to subject the inverter circuit to an input voltage source which suffers wide variations in voltage. Without compensating means, these wide variations in input voltage will produce similar variations of flux density in the transformer. It is thus necessary to provide a transformer which will adequately handle the peaks of flux and which therefore may be inefficiently used at lower flux levels. Less than optimum transformer utilization involves the obvious penalties of higher transformer cost than would be preferred and wasted weight to provide substantially unused capacity.

Accordingly, it is an object of this invention to provide a control system for a solid state high frequency inverter which maintains the peak flux level in the inverter transformer at a predetermined substantially constant level.

It is another object of this invention to provide a control system for a high frequency inverter which regulates the output voltage while requiring no direct connection to the output.

It is yet another object of this invention to provide a control system for a high frequency inverter which maintains isolation between the output and the power control elements.

It is still another object of this invention to provide a control system for a high frequency inverter which corrects any tendency to asymmetrical operation of the inverter without requiring additional high power components.

It is a further object of this invention to provide the above-mentioned features with a control system which is simple to implement, which has extremely fast response and which will not be damaged by overloads or short circuits.

Briefly stated, and in accordance with one aspect of this invention, a novel control circuit for a high frequency inverter power supply includes a sensor providing a signal proportional to instantaneous transformer flux, and a comparator wherein the output of the sensor is continuously compared to a reference signal corresponding to the peak flux desired and which comparator provides an output when the transformer flux is equal to or exceeds the predetermined level. Logic and timing means suitable for driving the semiconductor switching devices of a high frequency inverter in alternating fashion are provided to turn on one of said switching devices in response to the timing means and allow it to remain on until the transformer flux reaches the preselected level thereupon turning it off. This same sequence is then repeated for the second solid state switching device.

The features of the invention which are believed to be novel . . . are pointed out with particularity in the appended claims. The invention itself, however, both as to its organization and method of operation together with further objects and advantages thereof may best be understood by reference to the following description taken in connection with the accompanying drawings in which:

FIG. 1 is a block diagram of a partial schematic of a control system for a high frequency inverter in accordance with one aspect of this invention.

FIGS. 2a through 2j are oscillogram type waveform drawings of the various operating voltage currents and other parameters of the circuit of FIG. 1 as a function of time.

FIG. 3 is a schematic diagram of a high frequency inverter of the type suitable to be operated by the control system of this invention.

A control system 10 in accordance with one embodiment of this invention is illustrated in block diagram form in FIG. 1. Input terminal 11 is adapted to receive a transformer voltage signal as, for example, from a winding (see 67 of FIG. 3) especially provided for that purpose, or from any other convenient source consistent with the requirements of the particular embodiment especially as to isolation. This is to say that while a voltage signal may be derived from the same secondary of the inverter transformer which supplies the output, to do so would eliminate the possibility for complete isolation which is a feature of this invention. Where it is desired that precise control over output of voltage of the inverter be maintained with varying loads, winding 67 is preferably wound tightly coupled with secondary winding 82 of transformer 83. Where it is desired that a preselected reduction in output voltage with increasing current be provided, winding 67 is preferably tightly coupled to primary winding 80, or to the core of transformer 83, and not tightly coupled to secondary winding 82. The series combination of inductor 12 and resistor 14 provide at the node 15 therebetween a signal which is the integral with respect to time of the transformer voltage signal applied to input terminal 11. Inductor 12 and resistor 14 are chosen according to well known principles to yield a desired level of signal at node 15 at the frequency of operation of the inverter. According to the well known relationship between voltage, the number of turns, the flux level and time for an inductor, $$V = d/dt \, (N\Phi)$$

where V is the voltage, $\Phi$ is the flux, N is the number of turns, and $d/dt$ is the derivative with respect to time thereof. Taking the integral with respect to time of each side of the above identity yields the well known relationship $$\int V \, dt = N \Phi.$$

Since for a given physical inductor the number of turns remains constant, it is seen that the time integral of the voltage is equal to the instantaneous flux.

As it is the instantaneous transformer flux with which this invention is concerned, it is emphasized that taking the time integral of transformer voltage is but one method for obtaining a signal proportional to the flux. It is further emphasized that any means for providing a signal proportional to flux may be used, as for example, a Hall effect transducer which will directly provide such a signal. Where a different form of sensor of transformer flux is utilized, inductor 12 and resistor 14 are eliminated and node 15 becomes the input to the control system 10. Full wave rectifier 16 provides a rectified signal indicative of flux for comparator 18. Full wave rectifier 16 provides a signal indicative of flux which has its peak always positive with respect to ground regardless of the sense of the transformer flux. Since the transformer flux alternates in sign from one half cycle to the next, the use of full wave rectifier 18 is preferred to generate a signal wherein maximum flux is always indicated by a voltage of one sense, for example, as in the embodiment illustrated herein, a positive voltage. The output of full wave rectifier 16 is connected to input 19 of comparator 18, and a reference signal is connected to second input 20 of comparator 18. The reference signal is chosen to correspond to a preselected instantaneous level of flux as represented by the signal appearing at input 19 of comparator 18. The actual level of the reference signal will depend upon the particular transformer and the values of inductor 12, resistor 14 and the losses in full wave rectifier 16. The maximum voltage for the reference source will be limited by the capability of comparator 18, while the minimum voltage will be limited by noise considerations. Output 22 of comparator 18 provides a signal indicative of the relationship between the transformer flux signal and the reference signal as applied to inputs 19 and 20. When the voltage at input 19 is less than the voltage at input 20, output 22 will have a low sense. The comparator 18 therefore provides an output which is high when the instantaneous flux reaches a preselected level on each half cycle. As used in this application the terms "low" and "high" sense have their standard logical meanings and are not related to actual voltages. Further, for purposes of illustration, in the drawing all logic level voltages are represented as having either an arbitrary positive or zero magnitude. It is to be understood that these levels are chosen for purposes of ease of illustration and, in fact, may represent either positive or negative voltages. Output 22 of comparator 18 is connected to input 23 of OR gate 24. Input 25 of OR gate 24 is connected to the output of the current comparator as will be described below. The output of OR gate 24 is connected directly to the reset input 26 of RS flip-flop 28. Set input 29 of flip-flop 28 is connected to the output 30 of oscillator 31. It is preferable to design oscillator 31 to have an unsymmetrical output, that is to say that the "on" time is much longer than the "off" time at a frequency which is equal to twice the operating frequency of the inverter to which the control system is applied.

The control system of this invention is not limited to inverters operating at any specific frequency save only to limitations imposed by the particular logic chosen in the implementation of the invention. Other considerations, however, may impose certain restraints on the frequency of operation of the inverter itself. For a more complete discussion of the various constraints on inverter operating frequency as well as other considerations regarding the operation of high frequency power inverters generally, reference may be made to my co-pending application Ser. No. 516,788 entitled "Push-Pull Inverter Ballast for Arc Discharge Lamps," of like assignee as the instant invention and filed of even date herewith.

The output 30 of oscillator 31 is connected to input 33 of JK flip-flop 34. JK flip-flop 34 is as mentioned hereinabove chosen to be compatible with the outputs of the other logic level devices of this invention. Flip-flop 34 has two outputs, a Q output 35 and Q̄ output 36, Q and Q̄ having their conventional logic meanings. Q output 35 is connected to input 38 of AND gate 41. Q̄ output 36 is connected to input 43 of AND gate 46. Inputs 39 and 44 of AND gates 41 and 46 respectively are connected together and are then connected to output 30 of oscillator 31. Inputs 40 and 45 of AND gates 41 and 46, respectively, are similarly connected together and are connected to outputs 47 of RS flip-flop 28. Outputs 48 and 49 of AND gates 41 and 46, respectively, are adapted to be connected to the control elements of the solid state switching devices utilized in the particular inverter to be controlled by the control system hereinabove described. It is preferable that the logic elements which make up this embodiment be chosen for characteristics of high speed and relative insensitivity to random noise. Applicant has found that COS/MOS type logic is well suited to be utilized in this invention. The functions of oscillator 31, flip-flop 28, OR gate 24 and comparator 18 may be obtained through the use of a single integrated circuit such as the XR2556, manufactured by The Exar Corporation.

The control system as hereinabove described provides a new and unique method for controlling the operation of high frequency solid state inverters. As will be described in conjunction with FIG. 2 the control system 10 provides for a constant level of peak flux on the positive and negative half cycles of inverter operation without regard for asymmetries in the particular devices employed, thus providing for automatic asymmetry correction and optimum inverter transformer utilization. The addition of a minimum number of elements as will be hereinbelow described provides greatly increased versatility and precision of control over the high frequency inverter to which this invention is applied.

Input terminal 51 is adapted to be connected in the inverter circuit so that the total switching device primary current flows through resistor 52, see for example, FIG. 3. A voltage level is thereby produced which is indicative of the level of power transistor current flowing in the inverter primary. The placement of resistor 52 in the inverter power section is illustrated in FIG. 3 and was more completely described in application Ser. No. 516,788 hereinabove more completely identified. The voltage signal appearing across resistor 52 is applied to input 53 of current reference comparator 54. Input 55 of comparator 54 is adapted to be connected to a predetermined reference source corresponding to a preselected level of primary inverter switching device current. Comparator 54 acts in a manner similar to that described hereinabove for comparator 18 to provide an output signal at output terminal 56 indicative of the relationship between the current sensor signal at terminal 53 and the current reference source at input 55. When the level of current indicated by the voltage at input 53 is lower than the level indicated by the preselected reference voltage at input 55, the output of current reference comparator 54 will be low. When the current indicated by the voltage and input 53 is equal to or greater than the preselected current, the output of comparator 54 will be high. The output 56 of comparator 54 is connected to input 25 of OR gate 24, and also to the series combination of resistor 57 and capacitor 58. The series combination of resistor 57 and capacitor 58 is adapted to store a small quantity of charge related to the number of times comparator 54 switches from a low to the high state. This voltage which is present at node 59 is connected to bias input terminal 60 of oscillator 31 and effects the operation thereof as will now be described in conjunction with the waveform diagrams of FIG. 2.

The operation of control system 10 of FIG. 1 may be most readily understood with reference to the FIGS. 2a through 2j of the drawing in connection with the following remarks. In all cases, the time scales of the oscillogram type drawings of FIGS. 2a through 2j are the same so that ready comparison may be made therebetween and, additionally, so that the various causal relationships between the waveforms may be easily understood. It is also to be understood that the waveforms are illustrative of the steady state condition of the control circuit 10, all transient effects are assumed to have subsided. Further, as was hereinabove stated, the various logical levels are approximately only, as to magnitude thereof, and are intended to indicate high and low logic states. FIG. 2a illustrates the output 30 of oscillator 31. The oscillator output is unsymmetrical in form, that is to say, the "on" time is substantially longer than the "off" time. As will be readily understood from the description below the duration of the "off" time establishes a minimum time between conduction of the two solid state devices of the inverter to which this invention is applied. That is to say that the time during which the oscillator output is low is the time during which neither transistor can conduct. It is evident therefore that the conduction angle of each transistor is less than 180°. For purposes of this invention, this mode of inverter operation is referred to as quasi-square-wave. The falling edge of the oscillator pulse herein illustrated at time $t1$ triggers JK flip-flop 34 and RS flip-flop 28. As illustrated at FIG. 2f, the output 47 of RS flip-flop 28 changes state from low to high, and the Q output of JK flip-flop 34 illustrated at FIG. 2g also changes state in this case from low to high. Q output 36 of flip-flop 34 will also change state but this is not illustrated. At this time since the output of oscillator 31 is low, neither AND gate 41 nor AND gate 46 has a high output since the output 30 of oscillator 31 which is low is applied to inputs 39 and 44 of AND gates 41 and 46, respectively. This causes the aforementioned period during the cycle of the inverter when neither transistor is conducting as illustrated by FIG. 2h and 2i the outputs of AND gates 41 and 46, respectively. At time $t2$ the output of oscillator 31 changes state to a high level, and since the output 35 of flip-flop 34 and output 47 of flip-flop 28 were previously high, all of the inputs to AND gate 41 are high and therefore the output of AND gate 41 is high supplying an "on" signal to the solid state switching device connected thereto.

The waveforms illustrated by FIGS. 2b, 2c, 2d and 2j may be most readily understood by reference to FIG. 3 wherein a schematic diagram of a high power portion of an inverter is presented as was described hereinabove. Transistors 61 and 62 are the inverter switching transistors adapted to be driven from the outputs of AND gates 41 and 46 of FIG. 1. It is to be understood that while the outputs of AND gates 41 and 46 are said to drive the solid state switching devices of the inverter to which the invention is applied, as for example Q1 and Q2, it is necessary in cases where the base current requirements of the switching devices of the inverter exceed the currents which can be supplied by AND gates 41 and 46, that current amplifiers are inserted between the outputs 41 and 46, and the inputs of solid state switching devices to be controlled. The operation of inverter 9 of FIG. 3 is more completely described in copending U.S. Pat. application Ser. No. 516,788 hereinbefore more completely identified.

Referring again to FIG. 2, and especially to FIG. 2b, there is shown in graphic form the output d.c. voltage of the inverter which would appear across nodes 64 and 65. It is to be appreciated that this voltage is unfiltered, that is to say, there are no effects due to filter inductor 66.

FIG. 2c illustrates the transformer voltage, that is to say the voltage across a transformer winding as, for example, winding 67 of FIG. 3. In this case winding 68 is especially provided for the purposes of this invention, but it is pointed out that a voltage signal from an existing winding could also be used as, for example, from the secondary of the inverter transformer if isolation is not required. At time t2, the transformer voltage as illustrated by FIG. 2c rises from zero to a positive value which depends upon the particular input voltage chosen for the invention. As the transformer voltage remains high, the transformer flux as indicated in FIG. 2b increases from a negative value due to the preceding half cycle to a positive value which is a maximum at time t3.

FIG. 2e indicates the output of full wave rectifier 16 which output shows the level decreasing during the time between t2 and t3 when the actual transformer flux increases from a maximum negative value to zero, and then increasing until a maximum positive value is reached at t3. The important characteristic of the waveform of FIG. 2e is that the maximum value between time t2 and t3 occurs at time t3. FIG. 2e also shows in phantom the reference level of comparator 18. When this level is reached comparator 18 changes state, in this case from low to high, consequently OR gate 24 also changes state triggering reset input 26 of flip-flop 28 which it will be recalled by reference to FIG. 2f was in the high or "on" state. Flip-flop 28 consequently changes state from high to low as indicated in FIG. 2f at time t3. This low logic level signal is applied to AND gates 41 and 46 at inputs 40 and 45, respectively. The outputs of both AND gates are therefore forced to the low logic level and both transistors 61 and 62 are "off." At time t4 the output of oscillator 31 again switches states from high to low triggering the set input 29 of RS flip-flop 28 causing output 47 thereof to change to the high state. Until the rectified transformer flux of FIG. 2e increases to the level of the reference source applied to input 20 of comparator 18, the output of RS flip-flop 28 will remain high. In order for base drive power to be applied to one of the solid state switching devices, however, it is necessary that oscillator 31 return to the high logic level, and that JK flip-flop 34 be toggled so that the output Q becomes low and output Q̄ becomes high enabling AND gate 46. JK flip-flop 34 is designed to trigger on the rising edge of the oscillator pulse illustrated in FIG. 2a. This is a matter of design since it can be seen until oscillator 31 returns to the high state AND gates 41 and 46 are always inhibited and no output therefrom will occur. It can be readily seen that a function of JK flip-flop 34 is to select between AND gates 41 and 46 the one which will be energized when both oscillator 31 and RS flip-flop 28 are high. This causes alternate energization of the switching devices of the inverter.

The control system thus described provides inverter operation wherein peak flux density in inverter transformer is maintained constant for each half cycle of operation. This provides constant volt-seconds per half-cycle so that if the frequency of inverter operation is maintained constant, the output voltage will remain constant. The beginning of the period of conduction of the semiconductor switching devices is initiated by the rising edge of the oscillator output waveform. The combination of the period of conduction will be the result either of reaching the desired level of peak flux, or of reaching the preselected reference level of current in the primary inverter period. An important feature of this constant peak flux method of control is that inherent asymmetries both in the inverter itself and in the control circuit are effectively eliminated by the method of operation thereof. That is to say that any error which is present in detecting the peak positive flux due to the control circuit will also be present in detecting the peak negative flux. It is the nature of the integrator that the measured flux for each half cycle starts at the final level of the previous half cycle, that is to say that the increasing flux during the conduction of transistor 61 as is illustrated between times t2 and t3 as being in the positive direction begins at the point of peak negative flux due to the preceding half cycle. It is also to be appreciated that if either transistors 61 or 62 is slow to turn off as is often the case with power switching transistors, that the transformer flux will increase beyond the comparator reference level but that on the succeeding half cycle this asymmetry will be corrected since the flux in the opposite direction must increase to the absolute reference level established at input 20 of comparator 18. This will cause the succeeding half cycle to be longer than would normally be the case and therefore at the proper peak flux level. The effect of the asymmetric storage times of the power transistors therefore is not cumulative as is the case in prior art inverters of this type. The increase in flux therefore during any particular cycle causes the output voltage during that half cycle to be higher than the design value, but the peak flux of opposite polarity in the next half cycle remains constant so that the asymmetry does not cause the "ratchet" effect previously mentioned which would tend to drive the operating point of the inverter towards saturation on a transformer hysteresis curve.

As was previously discussed, the output of comparator 54 will change from a low logic state to the high state when the current through resistor 52 exceeds the current established as a limit by the voltage at input 55 of comparator 54.

FIG. 2j illustrates the relationship between the current through resistor 52 and the reference current established at the input 55 of comparator 54. In this case it will be noted that the current at all times is lower than the reference current. Therefore, comparator 54 has its output 56 maintained at a low logic level. Consequently, input 25 of OR gate 24 also remains low and no voltage appears across resistor 57 and capacitor 58. When the current as indicated by the voltage input 53 of comparator 54 exceeds the reference current, output 56 rises to a higher level, and reset input 26 of flip-flop 28 is triggered through OR gate 24. Output 47 of flip-flop 28 then changes from high to low and inhibits AND gates 41 and 46. Base drive is thereby removed from whichever of the transistors 61 or 62 was conducting at the time. Additionally, when the output 56 of comparator 54 goes to the high logic level a small amount of charge determined by resistor 57 and capacitor 58 is stored in capacitor 58 and a voltage is present at node 59. Input 60 of oscillator 31 is a frequency bias input which is designed so that the presence of a voltage at input 60 will result in a lowering of oscillator frequency in proportional to that voltage. It can be seen therefore that the voltage at node 59 and therefore at input 60 of oscillator 31 will be proportional to the amount of overcurrent detected by comparator 54. Protection is thereby provided against high current under short circuit output conditions. It is preferable that the values for resistor 57 and capacitor 38 be chosen to yield a time constant which is of approximately the same magnitude as a few cycles of oscillation of oscillator 31. A frequency bias signal is thereby provided which will gradually decrease the frequency, and hence the duty cycle of the inverter with response to short circuit or otherwise excessive current. Inverter 9 of FIG. 3 illustrates in addition to the components already mentioned the placement of resistor 52 in the inverter circuit. The operation of bridge rectifier 68 and capacitor 69, which capacitor is selected to have a low impedance at the fundamental operating frequency of the inverter and a high impedance at the 60 cycle input power frequency, where the voltage applied to the inverter therefore is a full-wave rectified a.c. voltage. The operation of inverter 9 is more completely described in U.S. patent application Ser. No. 516,788 hereinabove more completely identified.

The control system for a high frequency inverter power supply hereinabove described in a preferred embodiment thereof provides significant advantages over those known in the prior art. A regulated output voltage is supplied without the need for a sensor in the output portion of the inverter, thereby providing total isolation between the input and the output where such isolation is a desirable feature. Additionally, the control circit described provides constant volt seconds, that is to say constant peak flux in the transformer from cycle-to-cycle wherein the well known tendency of inverters of this type to asymmetrical operation is effectively controlled without the addition of components in the high power portion of the inverter. Effective inverter transformer utilization is therefore achieved, and the transformer is consequently required to be no larger than necessary to handle the actual load power without the usual requirement for excess capacity due to the tendency for asymmetrical operation and therefore for high saturation current spikes. An extremely simple to implement current limit feature provides the additional operating convenience of complete short circuit output protection with a minimum of additional parts.

While the invention has been particular shown and described with reference to several preferred embodiments thereof, it will be understood by those skilled in the art that various changes in form and detail may be made therein without departing from the true spirit and scope of the invention as defined by the appended claims.

What is claimed is:

1. A control circuit for a quasi square wave high frequency inverter having solid state switching devices comprising
    means sensing instantaneous transformer flux and providing an output proportional thereto,
    a first comparator wherein the output of said flux sensing means and a first reference signal are compared and an output is produced when said output proportional to instantaneous transformer flux exceeds said reference signal,
    an oscillator having a substantially square wave output at a selected frequency,
    means responsive to the outputs of said first comparator and said oscillator for providing turn-on and turn-off signals to said solid state switching devices so that the conduction time is controlled to provide a constant level of peak flux from half cycle to half cycle which is below the saturation level.

2. The control circuit of claim 1 further comprising
    means responsive to the total instantaneous current flowing through said solid state switching devices, providing an output proportional to said current,
    a second comparator wherein the output proportional to said instantaneous current and a second reference signal are compared, and an output signal is produced when said instantaneous current exceeds a preselected value established by said reference signal,
    means connecting said second comparator to said means responsive to said first comparator and said oscillator, so that said second comparator also causes a turn-off response.

3. The control circuit of claim 2 further comprising
    first means varying the frequency of said oscillator operative to lower said frequency in response to an increasing input signal,
    second means responsive to the output of said second comparator having an output which increases in response to increasing average output thereof, said second means operatively associated with said first means so that increasing average output of said comparator reduces said oscillator frequency.

4. A control circuit for a quasi square wave high frequency inverter having solid state switching devices comprising,
    means sensing instantaneous transformer flux and providing an output proportional thereto,
    a first comparator wherein the output of said flux sensing means and a first reference signal are compared and an output signal is produced when said output proportional to instantaneous transformer flux exceeds said reference signal,
    an oscillator having a substantially square wave output at a frequency substantially twice the inverter frequency,
    a first flip-flop circuit having set and reset inputs, and an output of either high or low sense, said set input connected to the output of said oscillator and said reset input connected to the output of said first comparator,
    a second flip-flop having an input and Q and Q outputs, said outputs being of differing sense, said input connected to the output of said oscillator,
    first and second AND gates each having three inputs and an output, the first input of each of said AND gates connected to the output of said first flip-flop, the second input of each of said AND gates connected to the output of said oscillator, and the third input of said first AND gate connected to the Q output of said second flip-flop, and the third input of said second AND gate connected to the Q output of said second flip-flop, and the outputs of said AND gates connected to said solid state switching device.

5. The control circuit of claim 4 wherein said first reference signal is selected to be equivalent to a level of instantaneous transformer flux less than the saturation level.

6. The control circuit of claim 5 wherein said means sensing instantaneous transformer flux comprises
    means sensing the instantaneous voltage of the transformer of said inverter and providing an output signal proportional thereto,
    means integrating said output signal with respect to time and providing a signal proportional to said integral.

7. The control circuit of claim 6 wherein said means sensing the instantaneous voltage of said trnsformer comprises a winding on said transformer, and further wherein said means integrating said output comprises an inductor and a resistor in series, across said transformer winding said output taken across aid resistor.

8. The control circuit of claim 5 wherein said means sensing instantaneous transformer flux comprises a Hall effect transducer.

9. The control circuit of claim 5 further comprising means sensing the instantaneous current flowing through said solid state switching devices and providing an output voltage proportional to said instantaneous current, a second comparator having two inputs and an output wherein the output of said means sensing the instantaneous current flowing through said solid state switching devices is compared to a second reference signal and an output signal is produced when said output of said means sensing instantaneous current exceeds said reference signal, the output of said second comparator connected to said reset input of said first flip-flop circuit.

* * * * *